June 26, 1962 B. W. FOSTER 3,041,010
AIR VORTEX SUSTAINED AIRCRAFT
Filed Dec. 8, 1959 4 Sheets-Sheet 1
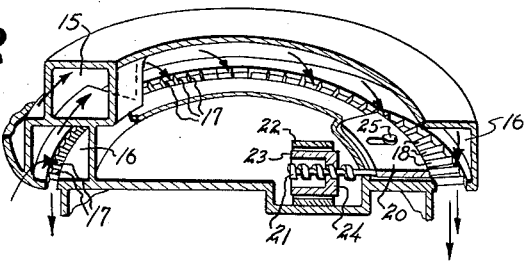
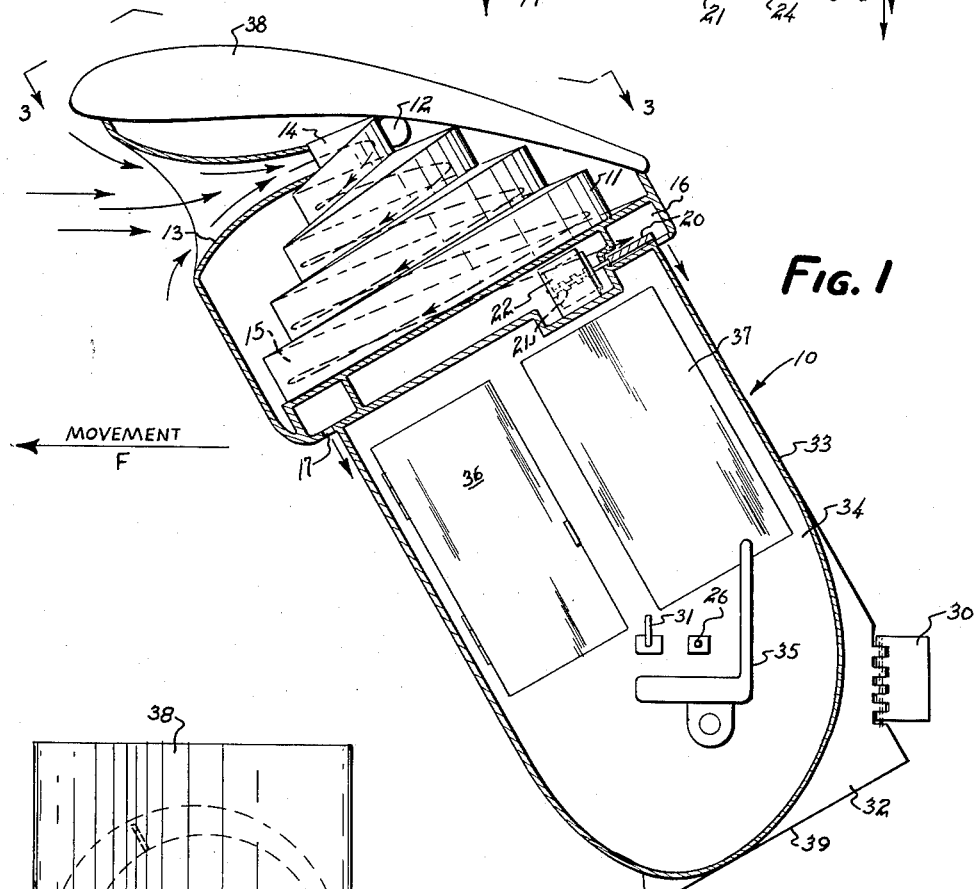
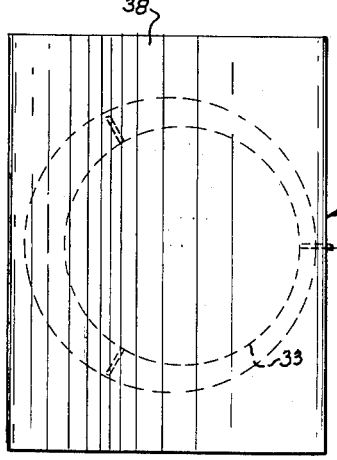
INVENTOR.
BERRY W. FOSTER
BY
ATTORNEY

INVENTOR.
BERRY W. FOSTER

June 26, 1962  B. W. FOSTER  3,041,010
AIR VORTEX SUSTAINED AIRCRAFT
Filed Dec. 8, 1959  4 Sheets-Sheet 3
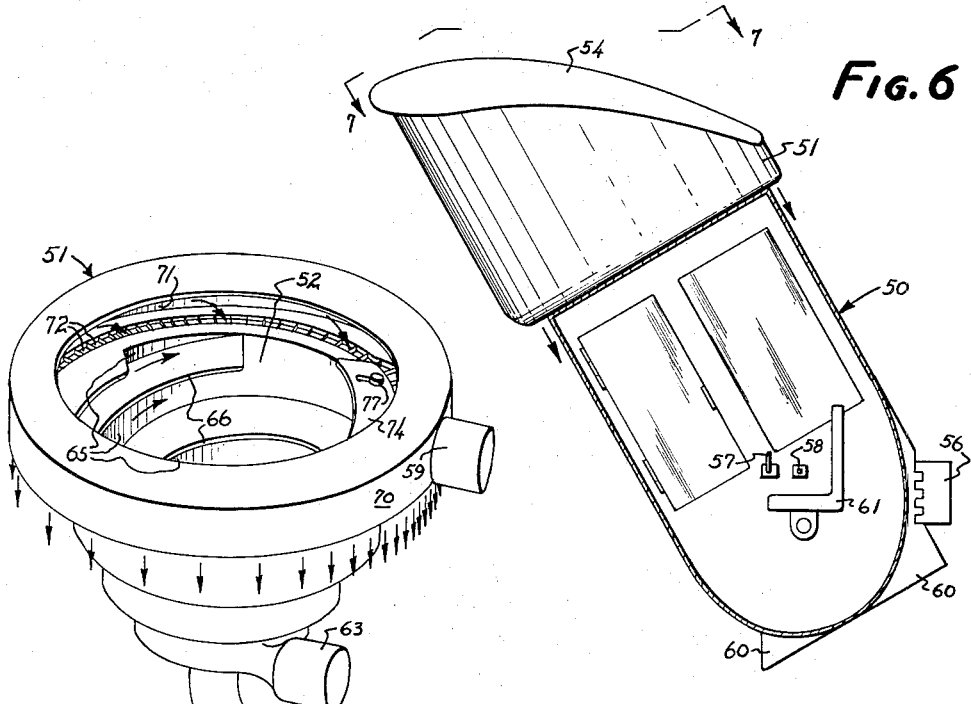
FIG. 6
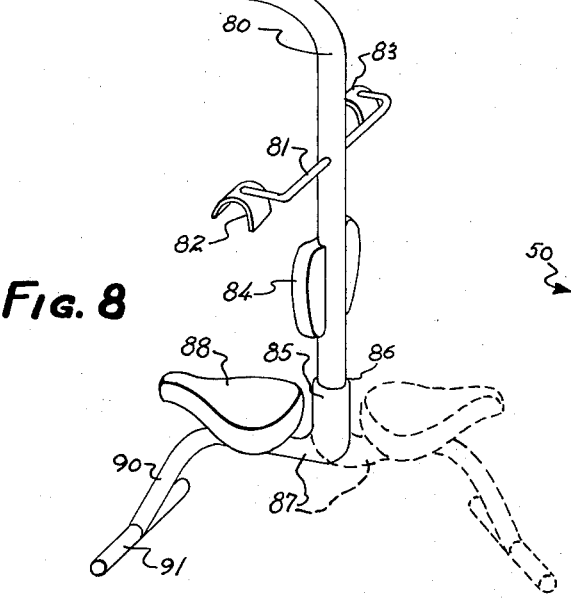
FIG. 8
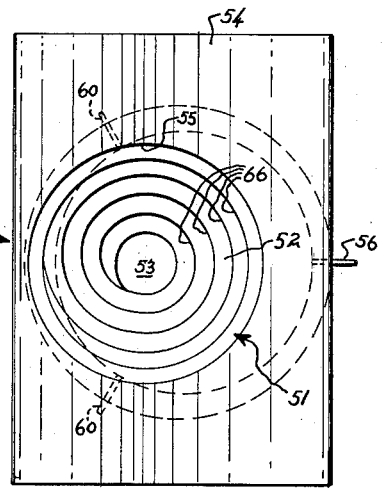
FIG. 7
INVENTOR.
BERRY W. FOSTER
BY 
ATTORNEY

INVENTOR.
BERRY W. FOSTER
BY
ATTORNEY

United States Patent Office 3,041,010
Patented June 26, 1962

3,041,010
AIR VORTEX SUSTAINED AIRCRAFT
Berry W. Foster, 1147 10th St., Santa Monica, Calif.
Filed Dec. 8, 1959, Ser. No. 858,289
17 Claims. (Cl. 244—12)

This invention relates to a novel aircraft and to the motive power and support therefor. The aircraft of this invention can take off and land vertically. This application is a continuation-in-part of application Serial No. 767,432, filed October 15, 1958, now abandoned.

One form of the invention utilizes as a prime component the jet pump described and claimed in my copending patent application, Serial No. 722,921, filed March 21, 1958, now Patent No. 2,938,658. That pump produces a spiral pumping action which improves the jet pumping action by virtue of a centrifugal field. In the present invention this pump is used to produce lift and forward thrust in an aircraft, by directing its exhaust gases to produce a jet thrust.

Another design of the invention utilizes a hot, high-velocity jet stream to generate a vortex in a spiraled helical housing. The vortex is designed to have a high suction force like the core of a tornado. This vortex pump creates a suction, which may be used to produce lift and forward thrust in an aircraft. In addition, the exhaust gases from this vortex pump may be directed through nozzles to produce lift and forward thrust in an aircraft.

Broadly speaking, the objects of the invention are to provide a new type of lift device for vertical-lift aircraft, to provide an aircraft suitable for one-man use with a minimum of structure, to provide a pump-operated aircraft, and to give improved performance and efficiency in vertical-lift aircraft. Other objects and advantages of the invention will appear from the following description of some preferred embodiments thereof.

In the drawings:

FIG. 1 is a view in elevation and partly in section of a vertical-lift aircraft embodying the principles of the present invention.

FIG. 2 is a perspective view, partly in section of a portion of the aircraft of FIG. 1 at the outlet from the jet pump.

FIG. 3 is a plan view of the aircraft of FIG. 1, looking down on FIG. 1 in the direction of the arrows 3—3.

FIG. 6 is a view in elevation and partly in section of an aircraft of FIG. 4 showing a wing.

FIG. 7 is a plan view looking down on FIG. 6 along the arrows 7—7.

FIG. 8 is a perspective view of another modified form of the invention, which may be termed a whirlwind cycle.

Figure 4:
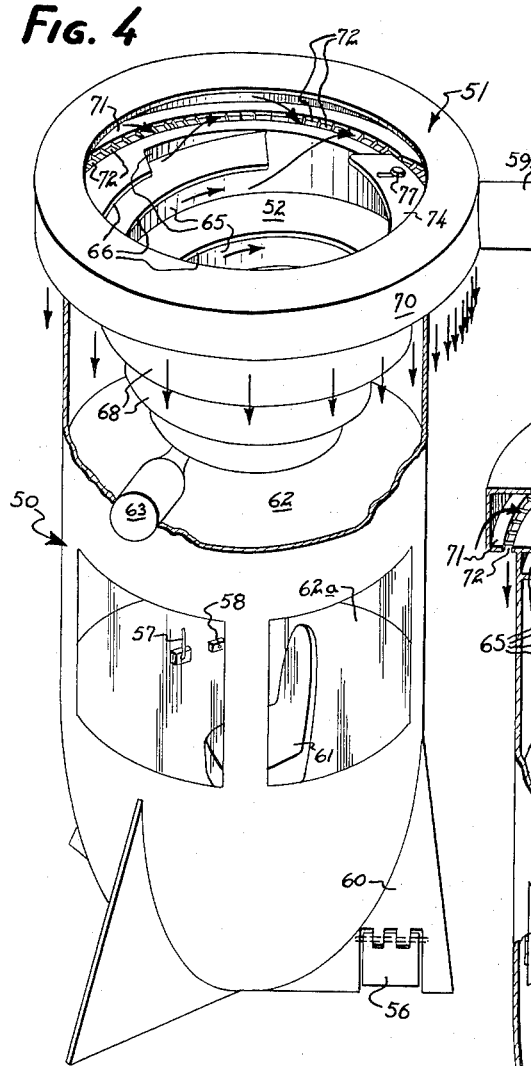
FIG. 4 is a view in perspective of a modified form of aircraft of the invention.

The Aircraft of FIGS. 1 to 3

FIG. 1 shows a novel vertical-lift aircraft 10, employing a jet pump 11 exactly like that described in my copending patent application, Serial No. 722,921, filed March 21, 1958, to which reference may be had for details of structure and operation. To the inlet of the pump 11 is connected a gas generator 12, which may be a rocket, a turbojet, or a free-piston gas generator like that in my Patent No. 2,807,136, or may be some other device. A bell-mouth inducer 13 is also preferably provided to direct air from the atmosphere into the pump 11 at its inlet end 14.

The whirlwind jet pump provides a spiral pumping action, which resembles that of a whirlwind in nature. A high velocity and high temperature jet stream of small mass flow from the gas generator 12 is used to pump a low velocity air stream of large mass flow to a slightly higher velocity. The temperature of this gaseous mixture is reduced below that of the high-temperature stream.

This whirlwind jet pump is more efficient than the conventional jet pump, because it has a centrifugal fluid pumping action which is not present in the conventional jet pump. Since this jet pump has no moving parts, it has an extremely long operating life and requires very little servicing.

At the opposite end of the pump 11, an exhaust tube 15 directs the gas into a hollow annulus 16, which is provided with a cascade of nozzles 17, in a circular ring, for example. The nozzles 17 so direct the exhaust gases as to give the aircraft 10 the desired lift and forward thrust.

Preferably a nozzle 18 of enlarged size is provided (as one of the cascade of nozzles 17) at the rear of the ring 16. A plate-type of valve 20 may be used to vary the area of the nozzle 18. The valve 20 may be operated by a helical screw or worm 21, driven by a reversible motor 22, with a rotor 23 that may be turned in either direction to open or close the valve 20, a gear member 24 engaging the screw 21. A slide 25 may be used to guide the valve plate 20. The motor 22 may be operated by a control device 26 inside the aircraft 10.

The aircraft 10 may have a rudder 30 for operation by the pilot in the normal manner through a control member 31. The rudder 30 may be pivotally mounted on the rear of a vertical fin 32, which helps stabilize the aircraft 10 during flight and may be used to support the aircraft in a vertical position when it is on the ground.

A housing 33 encloses a chamber 34 in which the pilot may sit in an adjustable or self-leveling chair 35. A door 36 and windows 37 may be provided.

The aircraft 10 may also have a wing 38 of whatever dimensions are desirable. If desired, the wing 38 may have ailerons, or the valve 20 will suffice for leveling the plane off.

Operation of the Aircraft 10

When the aircraft 10 is on the ground, it stands on the lower ends 39 of its fin or fins 32, the annulus 16 then being parallel to the ground and to the horizon. For vertical take-off, the pilot operates a control to start the gas generator 12, which directs its gases into the jet pump 11. Atmospheric air then enters the intake 13 and is mixed with hot high-velocity gases from the generator 12. The high-speed gases exhaust from the pump 11 into the annulus 16 and are directed to flow out therefrom vertically by the nozzles 17. By using the control 26, the pilot adjusts the nozzle area 18 so that the resultant thrust from all the nozzles 17 and 18 causes the aircraft 10 to lift vertically.

After the aircraft 10 reaches a desired altitude, the valve 20 may open the nozzle 18 wider, thereby giving additional thrust or lift at the rear end of the aircraft 10, causing it to take the attitude shown in FIG. 1. When the aircraft 10 is in this attitude, the jet thrust from the nozzles 17 produces both lift and forward propulsion of the aircraft. As the aircraft 10 moves forward in the direction of movement indicated by the arrows F, air flows past the wings 38, giving additional lift that supplements the lift component of the jets through the nozzles 17. It will be noted that the location of the wing 38 and the nozzles 17 and 18 above the center of gravity of the aircraft 10 gives it stability.

The aircraft 10 can be landed vertically by adjusting its controls in flight (by narrowing the nozzles 18) to place the annulus 16 parallel to the horizon. Then, by a slowing down of the gas generator 12, the thrust through the nozzles 17 and 18 can be reduced to gently lower the aircraft to the ground.

The Aircraft 50 of FIGS. 4–7

Figure 5:
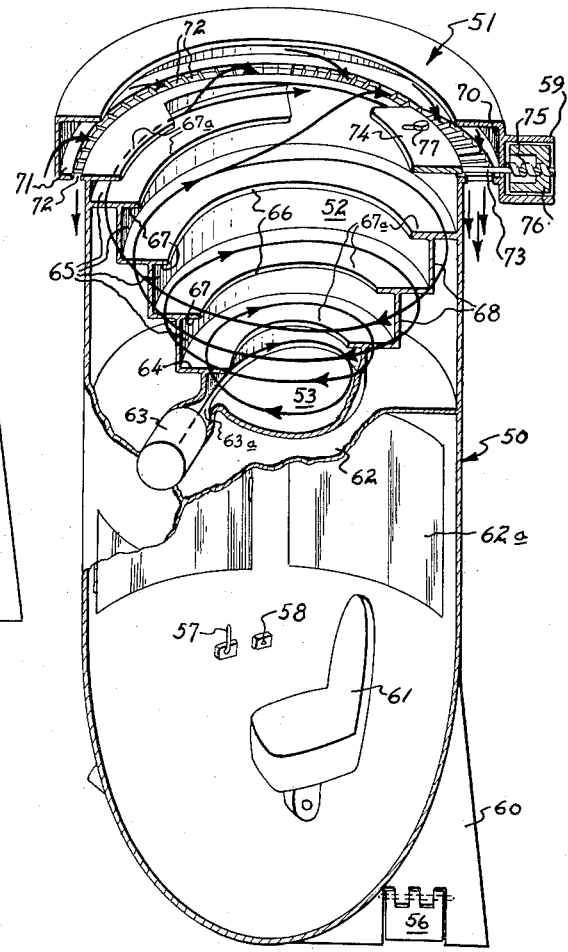
FIG. 5 is a perspective view like FIG. 4 but with parts broken away and parts shown in section.

In the aircraft 50, a jet vortex pump 51 is used to produce vertical lift. The pump 51 is annular and surrounds a hole 52 which is open to the atmosphere at its top. (See FIGS. 4 and 7.) The lower end of the hole 52 is closed by a plate 53. The aircraft 50 may be provided with a wing 54 as illustrated by FIGS. 6 and 7, but as shown by FIGS. 4 and 5 the wing may be omitted. The top of the wing 54, if used, has a hole 55 which lets the atmosphere flow via the hole 52 into the center of the vortex in the jet pump 51. The aircraft may be provided with a rudder 56 operated by controls 57. The pilot may use a control 58 to operate a motor 59. A vertical fin 60 may again be used to stabilize the aircraft 50 in flight and to stand the aircraft on the ground, and the pilot may have an adjustable seat 61. A fire and heat insulation wall 62 may be provided between the pilot cockpit 62a and the jet pump 51.

A compressed gas generator 63 such as a rocket, a turbojet, or a free-piston gas generator may be used to produce a high velocity pumping fluid. The high velocity pumping fluid passes through a nozzle 63a and is directed and forced to spiral in a C-shaped spiral channel 64 which forms a helical spiral flow path. The turning radius of the channel 64 increases as the gas flows along its helical spiral path. The channel 64 has an outer rim 65, forcing the gases to turn and produce a centrifugal force on the gases. The gas pressure at the radially outer side of the channel 64 will therefore be greater than the gas pressure at the radially inner side. The C-shaped channel 64 is open at its radially inner edge 66, which faces the center of the vortex and opens into the hole 52. The channel 64 is designed so that the pressure at its rim 66 will be less than atmospheric; the pressure on the inside surface 67 of the channel 64 may be slightly less than, equal to or greater than atmospheric, depending upon the operating conditions. The inside surfaces include the lower surface of the top flange, the inner surface of the rim 68, and the portion of the top surface for the lower flange that lies radially outward from the inner edge 66 of the flange directly above it. The pressure on the top surface portion 67a will be less than atmospheric. (The surface portion 67a lies radially inwardly from the inner edge 66 of the flange directly above it.) This suction then produces a lift on the aircraft 50, which helps to support it in flight. As the high velocity gases are forced to follow the helical channel 64, they pump atmospheric air in from the open center 52 of the vortex and produce a mixed gas stream in the channels.

The mixed gases in the helical channels are exhausted into a circular annulus 70, which also has a C-shaped cross section. The bottom 71 of the annulus 70 may be provided with a cascade of nozzles 72. The nozzles 72 direct the exhaust gas jet downward to give a vertical lift thrust. An enlarged nozzle area section 73 may be provided at the rear segment of the nozzle cascade 72, with a slide valve 74 to adjust the area of the nozzle segment 73. The valve 74 may be operated by the motor 59; a helical screw 75 may be driven by rotor 76 in either direction to close or open the nozzle section 73. A slide 77 may guide the valve 74.

Operation of the Aircraft 50

When the aircraft 50 is on the ground, it will stand in a vertical position on its fins 60. In order to take off vertically, the valve 74 is set at a position where the jet thrust through the nozzles 72 is equally distributed around the circumference of the nozzle ring. The flow of hot, high-velocity gases from the gas generator 63 to the nozzle 63a is increased. As these high velocity gases spiral through the helical C-shaped channel 64, a whirlwind or vortex is produced and the low-velocity air is pumped from the hole 52 in the center of the vortex; this pumping action producing a reduced pressure on the upper surface portion 67a of the helical rings, which is below atmospheric pressure. This sub-atmospheric pressure on the upper surface produces a lift on the aircraft 50. The mixed high-velocity gases in the C-shaped channels are discharged into the circular annulus 70 and then directed vertically downward by nozzles 72. The jet reaction of these jet streams from nozzles 72 will produce a vertical lift on the aircraft 50. Thus, the aircraft 50 has two sources of lift, for vertical take-off.

When the aircraft 50 is at the desired altitude, the valve 74 can be opened so that jet thrust reaction at the rear of nozzle ring 72 is increased until the aircraft 50 takes its FIG. 6 position. At this position the jet thrust from nozzles 72 will produce a forward thrust and lift on the aircraft. As the aircraft 50 moves forward through the air, the wing 54 produces lift. The suction action of the whirlwind also produces much of the aircraft lift.

A One-Man Whirlwind Cycle (FIG. 8)

A jet vortex pump 51 may be used to lift and propel a man through the air. Like the design for FIGS. 4 to 7, the pump has a hole 52, which is opened to the atmosphere at its top. A compressed gas generator 63 such as a rocket, or turbojet, or a free-piston gas generator, may be used to produce the high-velocity pumping fluid. The exhaust gas jet stream is directed downward through nozzles 72 of the cascade ring 70. This exhaust gas jet stream will produce part of the lift and forward thrust for the flying whirlwind cycle. Most of the lift will come from the suction on the upper surface of the helical channels in the hole 52.

A tubular column 80 may be secured to the bottom of the jet pump 51, to support the pilot. A beam 81 may be secured to the column 80, and it may be provided with shoulder pads 82 and 83 which rest on the pilot's shoulders, so that he helps support the whirlwind cycle when he is on the ground. A back rest 84 may be provided. A swivel joint 85 may be provided at the bottom of column 80, and a thrust bearing 86 may bear on the swivel joint 85. A cantilevered beam 87 may be secured to the thrust bearing 86, and a seat 88 may be mounted on the beam 87. Also, a column 90 may be secured to the beam 87, and a foot rest 91 may be secured to the end of the column 90. When the whirlwind cycle is flying through the air, the seat 88 and its supporting structure is in the solid line position. When the pilot is lifting or carrying the whirlwind cycle on the ground, the seat and its supporting structure may be in the broken line position.

The direction at which this whirlwind cycle will fly through the air is sensitive to the pilot's center of gravity with respect to the jet pump; so he can accurately control its direction of flight by shifting his body.

Figure 9:
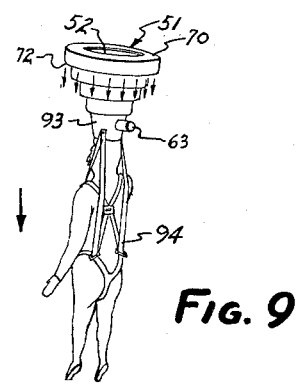
FIG. 9 is a perspective view of still another modified form of the invention, which may be termed a whirlwind chute, and which may replace a parachute.

A Whirlwind Chute 90 (FIG. 9)

The whirlwind chute of FIG. 9 can replace a parachute or may be used as a one-man lift device. A helmet and column 93 may support the whirlwind vortex suction pump 51 on a person's head. The gas generator, or rocket 63, is started, and when the person jumps into space, the suction of the whirlwind chute will simulate the drag action of a parachute, so he can land at a safe speed. The harness 94 will support the person to the whirlwind chute as he descends. Near the ground the gas mass flow of the gas generator 63 may be increased sufficiently so that the person may fly in any desired direction by shifting his body.

The whirlwind chute uses the suction action of the whirlwind jet vortex pump 51 to produce a lift drag; also the jet stream from the nozzles 72 produces a thrust which supplements this lift drag; so a man can land at a safe speed when he jump from an aircraft. One can land on a smaller spot with this whirlwind chute than he can with a parachute, which is very bulky when it is open. An enemy will find the whirlwind chute a much smaller target to hit than a parachute.

The whirlwind chute can also be very effectively used to slow down a small rocket and land it on the earth without destructive impact. After a rocket has entered the earth's atmosphere, the rocket jet stream can be more efficiently used in a whirlwind chute rather than by producing a negative jet thrust directly.

*A Vortex Pump 100 With Stator Intake Inducers (FIG. 10)*

Figure 10:
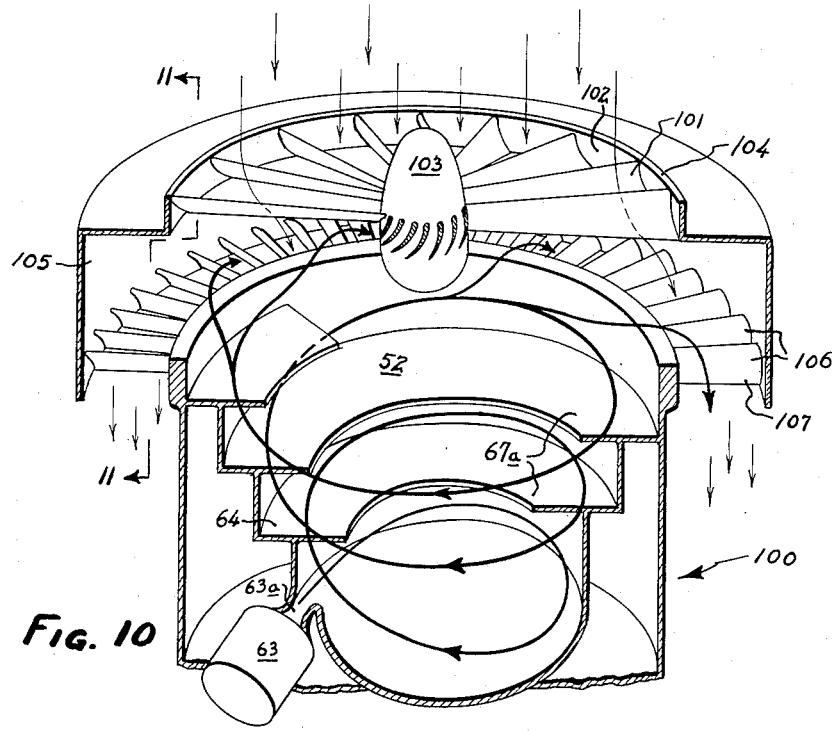
FIG. 10 is a fragmentary view generally similar to FIG. 5 but showing the additional use of inlet guide vanes.
Figure 11:
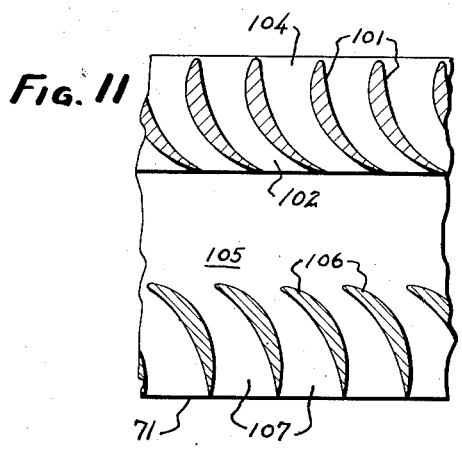
FIG. 11 is a fragmentary view in section taken along the line 11—11 in FIG. 10 showing a preferred form of airfoil sections for the cascade of outlet nozzles and subsonic inlet guide vane.
Figure 12:
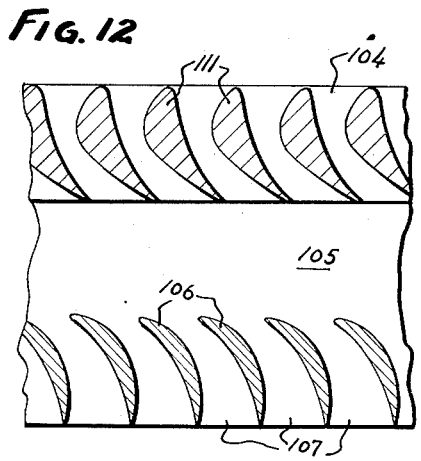
FIG. 12 is a view similar to FIG. 11, but showing a modified form of inlet guide vanes for use in supersonic conditions.

Except for intake guide vanes 101 and their associated parts, the jet vortex pump 100 of FIG. 10 is identical to the jet vortex pump 51 shown in FIGS. 4 to 9. The intake guide vanes 101 are placed at a top opening 102 to the hole 52 and extend radially from a hub 103 at the center of the inlet opening 102 to a supporting peripheral shroud ring 104. The angle of attack and the camber of the guide vanes 101 turn the inlet air flow from a downwardly axial direction to a clockwise direction; thus the air turns in the same direction as the vortex gases when the air and gases impact, and their mixing is quite efficient. The exact shape of the guide vanes 101 depends on the type of operation, differing somewhat for sonic and supersonic operation; for example the guide vanes 101 of FIG. 11 may be used for subsonic inlet flow and discharge, and the vanes 111 of FIG. 12 may be used for supersonic discharge from the vanes.

The opening 52 of the vortex pump 51 leads to a circular annulus 105, which is C-shaped and opens toward the center of the vortex. The bottom 106 of the annulus 105 may be provided with a cascade of nozzles 107 that direct the exhaust gas jet downwardly to give a vertical lift thrust.

*Operation of the Vortex Pump 100 of FIG. 10*

Hot, high-velocity gases flow from the gas generator 63 through the nozzle 63a, and as these high-velocity gases flow through the helical C-shaped channel 64, a whirlwind or vortex is produced. The low-velocity air is pumped from the hole 52 in the center of the vortex; this pumping action produces a reduced subatmospheric pressure on the upper surface portions 67a of the helical rings, resulting in a lift on the aircraft to which this pump 100 is secured. The subatmospheric pressure in the center of the vortex sucks in air through the guide vanes 101, which direct this air so that it turns in the same direction as the vortex gases against which it impacts. The inlet guide vanes 101 may be designed so that the flow of air past them will produce a lift thrust. The mixed gas is forced by centrifugal force to flow into the C-shaped channels 64 and annulus 105, whence it is then directed downward by the nozzles 107. The jet reaction of these jet streams from the nozzles 107 produces a vertical lift on the aircraft. Thus, in effect the aircraft may have three sources of lift for vertical take-off.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An aircraft capable of vertical take-off and landing, comprising a supporting body, a whirlwind jet pump on said body having a spiral conduit gradually increasing in diameter between an inlet and an outlet, a gas generator connected to said inlet, air-inducer means also connected to said inlet, said outlet having an exhaust ring with downwardly directed vanes, and means for varying the outlet area at some of said vanes.

2. The aircraft of claim 1 having a wing on said body adjacent said pump for helping to support it in flight, and rudder means on said body for helping to give directional control to said aircraft.

3. The aircraft of claim 2 having in said body an adjustable seat pivoted relative to said body to keep the pilot at a desirable attitude when the attitude of aircraft changes.

4. An aircraft capable of vertical take-off and landing, comprising a body, a vortex pump supported at the upper end of said body and comprising an annular spiral conduit whose diameter increases with its length between an inlet at its lower end and an outlet at its upper end, said conduit being open on its radially inner side for direct communication with the atmosphere through a central opening, said opening being closed at its lower end; means for supplying high-velocity, high-temperature gases to said inlet, whereby a vortex flow results in pulling in air from said central opening, resulting in a lifting suction of subatmospheric pressure, said outlet comprising a ring with downwardly directed vanes on its lower side and means for varying the outlet area between vanes at a portion of said ring.

5. The aircraft of claim 4 having a wing supported at the upper end of said vortex pump with a hole therethrough connected with said central opening, so that when said aircraft moves forward, it is supported by lift from said wing as well as vortex suction and jet thrust from said nozzles.

6. The aircraft of claim 4 wherein said body comprises a vertical pillar, a leg on said pillar, a seat on said leg, and means on said pillar to support the pilot in the free airstream, thereby providing a whirlwind cycle, the direction at which this whirlwind cycle flies through the air being thereby sensitive to the pilot's center of gravity with respect to said pump, so that he can accurately control its direction of flight by shifting his body.

7. The aircraft of claim 6 in which the area of said vanes in said ring remains fixed and the pilot guides the said aircraft solely by shifting his center of gravity.

8. The aircraft of claim 4, wherein the center of gravity of said aircraft lies below its center of lift for all normal flying conditions.

9. The aircraft of claim 4 having means for guiding the inlet air from the atmosphere to said vortex pump in a stream turning in the same direction as the gas in said pump, thereby efficiently imparting energy as the two fluids impact upon each other.

10. The aircraft of claim 9 wherein said guiding means comprises a circumferential cascade of stator guide vanes extending radially out from the center of the air inlet for said vortex pump, said guide vanes being slanted to direct the inlet air to flow in the same direction as the vortex gases.

11. A vortex pump flying device comprising a casing providing an annular spiral conduit whose diameter increases with its length between an inlet at its lower end and an outlet at its upper end, said conduit being open on its radially inner side for direct communication with atmospheric air through a top inlet hole around which said casing defines a shroud ring, said opening being closed at its lower end, the outlet from said casing comprising a ring with downwardly directed vanes on its lower side for directing the exhaust gases to produce a jet thrust that helps to lift and propel an object in flight; means for supplying hot, high-velocity gases to said inlet; and a circumferential cascade of stator guide vanes that extend radially from the center of said top inlet hole to said shroud ring, the camber being designed for the prescribed flow condition and the angle of attack of said guide vanes being set to turn the intake air flow in the same direction as the vortex gases, when it is impacted by these gases, whereby a vortex flow results in pulling air in from said control opening through said inlet guide vanes and producing a lifting sub-atmospheric pressure.

12. A whirlwind chute comprising a body, a vortex pump supported at a trailing end on said body and comprising an annular spiral conduit whose diameter increases with its length between an inlet at its leading end and an outlet at its trailing end, said conduit being open on its radially inner side for direct communication with the atmosphere through a central opening, said opening being closed at its leading end; and means for supplying high-velocity, high-temperature gases to said inlet, whereby a vortex flow results in pulling in air from said central opening, resulting in a drag suction of sub-atmospheric pressure, said outlet comprising a ring with vanes on its leading surface for directing the exhaust jet to produce a jet thrust that resists the motion of said body.

13. A device capable of lifting and propelling an object in flight, comprising a vortex pump having an annular spiral conduit whose diameter increases with its length between an inlet at its lower end and an outlet at its upper end, said conduit surrounding a central opening that is closed at the lower end of said conduit and open at the upper end, said conduit being open on its radially inner side for direct communication with the atmosphere through said central opening; means for supplying hot, high-velocity gases to said inlet, whereby said gases follow said spiral conduit and a vortex flow results in pulling in air from said central opening, resulting in a lifting suction of sub-atmospheric pressure, and a ring at said outlet with downwardly directed vanes on its lower side for directing the exhaust gases to produce a jet thrust that helps to lift and propel said object in flight.

14. The device of claim 13 wherein the means for supplying hot, high-velocity gases to said inlet comprises a high-pressure and high-temperature gas generator and a nozzle through which its gases are expanded into said inlet.

15. An aircraft comprising a supporting body, at least one jet pump having only stationary parts, including a helical-spiral conduit, the diameter of the spiral increasing in diameter between an inlet and an outlet, air intake means, means for supplying high velocity gases to said inlet, and a stationary exhaust ring at said outlet having downwardly directed vanes.

16. The aircraft of claim 15 having a wing secured to said body.

17. The aircraft of claim 15 having guide vane means at said air intake means for directing the intake of atmospheric air.

References Cited in the file of this patent

FOREIGN PATENTS

| | | |
|---|---|---|
| 377,237 | Great Britain | July 22, 1932 |
| 191,488 | Switzerland | June 30, 1937 |
| 1,006,266 | Germany | Apr. 11, 1957 |
| 806,614 | Great Britain | Dec. 31, 1958 |